United States Patent
Han et al.

(10) Patent No.: US 12,464,130 B2
(45) Date of Patent: Nov. 4, 2025

(54) METHOD AND DEVICE FOR PICTURE CODING, AND STORAGE MEDIUM

(71) Applicants: Beijing Wodong Tianjun Information Technology Co., Ltd., Beijing (CN); Beijing Jingdong Century Trading Co., Ltd., Beijing (CN)

(72) Inventors: Bing Han, Beijing (CN); Zhiwei Ge, Beijing (CN); Sulong Xu, Beijing (CN)

(73) Assignees: Beijing Wodong Tianjun Information Technology Co., Ltd., Beijing (CN); Beijing Jingdong Century Trading Co., Ltd., Beijing (CN)

(*) Notice: Subject to any disclaimer, the term of this patent is extended or adjusted under 35 U.S.C. 154(b) by 447 days.

(21) Appl. No.: 17/716,116

(22) Filed: Apr. 8, 2022

(65) Prior Publication Data

US 2022/0329820 A1    Oct. 13, 2022

(30) Foreign Application Priority Data

Apr. 9, 2021 (CN) .......................... 202110383941.8

(51) Int. Cl.
*H04N 19/136* (2014.01)
*G06V 10/40* (2022.01)
(Continued)

(52) U.S. Cl.
CPC .......... *H04N 19/136* (2014.11); *G06V 10/40* (2022.01); *G06V 10/762* (2022.01); *G06V 10/774* (2022.01); *H04N 19/172* (2014.11)

(58) Field of Classification Search
CPC .... H04N 19/136; H04N 19/172; H04N 19/94; G06V 10/40; G06V 10/762;
(Continued)

(56) References Cited

U.S. PATENT DOCUMENTS

2019/0206091 A1* 7/2019 Weng ...................... G06T 9/002
2021/0201073 A1* 7/2021 Zhao ....................... G06F 18/23
(Continued)

FOREIGN PATENT DOCUMENTS

CN       102725775 A    10/2012
CN       103646409 A     3/2014
(Continued)

OTHER PUBLICATIONS

Unsupervised ranking of clustering algorithms by INFOMAX, by Sandipan Sikdar, Animesh Mukherjee, Matteo Marsili, Pub: PLoS ONE, 15(10), e0239331: DOI: 10.1371/journal.pone.0239331, Pub. Oct. 26, 2020 (Year: 2020).*

(Continued)

*Primary Examiner* — Jennifer Mehmood
*Assistant Examiner* — Heath E. Wells
(74) *Attorney, Agent, or Firm* — Cooper Legal Group, LLC

(57) ABSTRACT

Embodiments of the application disclose a method and device for picture coding, and a storage medium, the device for picture coding is configured to train an initial feature extraction model with first training data, to obtain a target feature extraction model; train an initial clustering model with second training data, to obtain a first clustering model; and perform picture coding on picture data according to the target feature extraction model and the first clustering model, to obtain coded data corresponding to the picture data.

17 Claims, 13 Drawing Sheets

(51) Int. Cl.
*G06V 10/762* (2022.01)
*G06V 10/774* (2022.01)
*H04N 19/172* (2014.01)

(58) Field of Classification Search
CPC .... G06V 10/774; G06V 10/82; G06V 10/462; G06T 9/001; G06T 9/002; G06F 18/214; G06F 18/23; G06N 3/045; G06N 3/08
USPC .......................................................... 382/159
See application file for complete search history.

(56) References Cited

U.S. PATENT DOCUMENTS

| | | | |
|---|---|---|---|
| 2021/0201090 A1* | 7/2021 | Xu | G06F 16/56 |
| 2022/0058420 A1* | 2/2022 | Peng | G06V 20/63 |
| 2022/0076062 A1* | 3/2022 | Lee | G06T 1/00 |
| 2023/0334089 A1* | 10/2023 | Dandekar | G06V 40/172 |
| 2023/0343099 A1* | 10/2023 | Domanski | H04N 19/50 |
| 2023/0421764 A1* | 12/2023 | Ahn | G06V 10/764 |

FOREIGN PATENT DOCUMENTS

| | | | | |
|---|---|---|---|---|
| CN | 104199922 A | 12/2014 | | |
| CN | 105224943 A | 1/2016 | | |
| CN | 105913083 A | 8/2016 | | |
| CN | 109740660 A | 5/2019 | | |
| CN | 109902600 A | 6/2019 | | |
| CN | 109902736 A | 6/2019 | | |
| CN | 109948662 A | 6/2019 | | |
| CN | 110580695 A | 12/2019 | | |
| CN | 110688502 A | 1/2020 | | |
| CN | 111079556 A | 4/2020 | | |
| CN | 111091166 A | 5/2020 | | |
| CN | 111316326 A | 6/2020 | | |
| CN | 111444390 A | 7/2020 | | |
| CN | 111476767 A | 7/2020 | | |
| CN | 111626058 A | 9/2020 | | |
| CN | 112070809 A | 12/2020 | | |
| JP | H06334868 A | 12/1994 | | |
| WO | 2018204764 A1 | 11/2018 | | |
| WO | WO-2020215560 A1 * | 10/2020 | ........... | G06F 16/353 |
| WO | 2020231005 A1 | 11/2020 | | |

OTHER PUBLICATIONS

"Learning Deep Representations by Mutual Information Estimation and Maximization", 2019, R. Devon Hjelm, Alex Edorov, Samuel Lavoie-Marchildon, Karan Grewal, Phil Bachman, Adam Trischler and Yoshua Bengio, Accepted as an oral presentation at the International Conference for Learning Representations (ICLR), Machine Learning, arXiv: 1808.06670v5, 24 pgs.

Huang Yufeng, Liu Jianguo, "BCF: Bags of Convolution Features for Fast Visual Place Recognition", Computer & Digital Engineering, vol. 46 No. 4, Apr. 20, 2018, 6 pages.

Wang Mengsi et al, "Image forgery detection based on sparse autcencoder feature and clustering algorithm", Application Research of Computers, vol. 35 No. 12, Dec. 2018, 4 pages with English abstract.

* cited by examiner

METHOD AND DEVICE FOR PICTURE CODING, AND STORAGE MEDIUM

CROSS REFERENCE TO RELATED APPLICATION

This application claims priority to Chinese Patent Application No. 202110383941.8, filed on Apr. 9, 2021, and entitled "METHOD AND DEVICE FOR PICTURE CODING, AND STORAGE MEDIUM", the disclosure of which is hereby incorporated by reference in its entirety.

TECHNICAL FIELD

The disclosure relates to the technical field of picture coding, and in particular to a method and device for picture coding, and a storage medium.

BACKGROUND

Picture coding technology refers to a technology in which an picture or information contained in the picture is represented with a smaller number of bits while meeting a certain accuracy. Existing picture coding technology mainly captures the picture based on features, structures, edge information, or the like at a pixel level of the picture, which may better resist geometric deformation or luma change. However, the existing picture coding technology cannot detect the most meaningful part of the picture, and has little connection with a high-level semantics of the picture.

Therefore, the existing picture coding technology has poor the capability of recognizing pictures, and picture coding based on the existing picture coding technology cannot characterize information of in-depth features of the picture well.

SUMMARY

According to a first aspect, an embodiment of the disclosure provides a method for picture coding, which may include the following operations.

An initial feature extraction model is trained with first training data, to obtain a target feature extraction model.

An initial clustering model is trained with second training data, to obtain a first clustering model.

Picture coding is performed on picture data according to the target feature extraction model and the first clustering model, to obtain coded data corresponding to the picture data.

According to a second aspect, an embodiment of the disclosure provides a terminal including a training unit and a coding unit.

The training unit is configured to train an initial feature extraction model with first training data, to obtain a target feature extraction model, and train an initial clustering model with second training data, to obtain a first clustering model.

The coding unit is configured to perform picture coding on picture data according to the target feature extraction model and the first clustering model, to obtain coded data corresponding to the picture data.

According to a third aspect, an embodiment of the disclosure provides a device for picture coding, including a processor and a memory storing instructions executable by the processor, the instructions are configured to, when executed by the processor, implement the method for picture coding as described above.

According to a fourth aspect, an embodiment of the disclosure provides a computer-readable storage medium, storing a program and applied to a device for picture coding, the program is configured to, when executed by a processor, implement the method for picture coding as described above.

DETAILED DESCRIPTION

Figure 1:
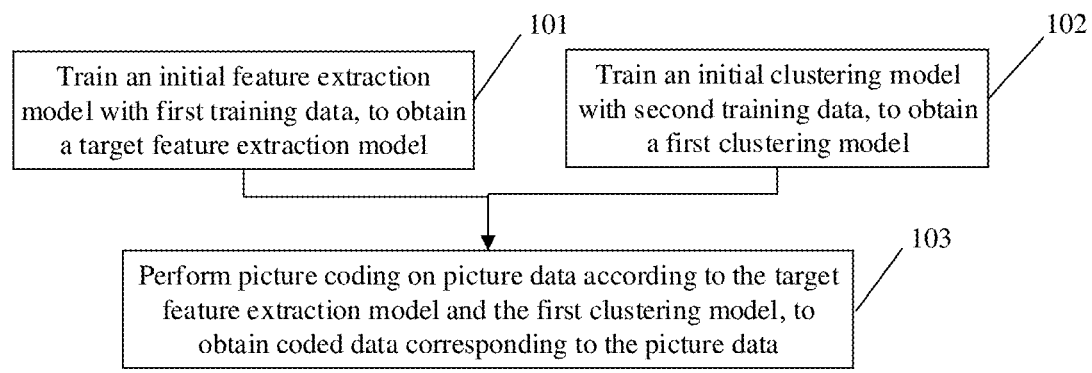
FIG. 1 is a first schematic flowchart of implementation of a method for picture coding according to an embodiment of the disclosure.

Technical solutions of the embodiments of the disclosure will be clearly and completely described below in combination with drawings in the embodiments of the disclosure. It may be understood that specific embodiments described herein are intended only to explain related application, rather than limit the application. In addition, it should be noted that for ease of description, only the parts related to the related application are shown in the drawings.

Picture coding refers to a technology in which an picture or information contained in the picture is represented by a small number of bits while meeting a certain accuracy. Existing picture coding technology includes picture compression technology based on high-precision analog-to-digital transform and signal coding, such as predictive coding, transform domain coding, or the like; hash algorithm for judging picture similarity, such as average hash, perceptual hash, differential hash, or the like; and picture processing related algorithm based on texture features and edge information extraction, such as scale invariant feature transformation, directional gradient histogram, local binarization, or the like.

The existing picture coding technology mainly captures complex information of the picture based on features or textures, structures, edge information, or the like at a pixel level of the picture, and thus has good capability to resist to geometric deformation or luma change. However, the existing picture coding technology usually cannot detect the most meaningful part of the picture, and has little connection with a high-level semantics of the picture.

Regarding a scene containing hundreds of millions of pictures, for example, in an e-commerce scenario, a search result page may contain a large number of products with the same main picture, and some tail-ranked merchants embezzle main pictures of best-selling products of the head-ranked merchant, to modify logo, crop the background, splice multiple pictures, or the like, and upload them as the main pictures of their own products. Based on the existing picture coding technology, it is unable to effectively determine whether there is a suspicion of plagiarism between the pictures on the search result page, and then it is unable to effectively deal with such situation.

In order to solve problems existing in the related art, embodiments of the disclosure provide a method and device for picture coding, and a storage medium, specifically, the device for picture coding is configured to train an initial feature extraction model with first training data, to obtain a target feature extraction model; train an initial clustering model with second training data, to obtain a first clustering model; and perform picture coding on picture data according to the target feature extraction model and the first clustering model, to obtain coded data corresponding to the picture data. It may realize accurate data transmission and improve efficiency of data transmission.

The technical solutions of the embodiments of the disclosure will be clearly and completely described below in combination with drawings in the embodiments of the disclosure.

First Embodiment

An embodiment of the disclosure provides a method for picture coding, FIG. 1 is a first schematic flowchart of implementation of a method for picture coding according to an embodiment of the disclosure. As shown in FIG. 1, the method for picture coding may include the following operations.

In operation 101, an initial feature extraction model is trained with first training data, to obtain a target feature extraction model.

In the embodiment of the disclosure, the device for picture coding is configured to firstly train the initial feature extraction model with the first training data, to obtain the target feature extraction model.

It may be understood that in the embodiment of the disclosure, the first training data refers to data for training the initial feature extraction model. Since the device for picture coding in the disclosure codes the picture data, the first training data is of a type of picture data. For example, the first training data may be a 64*64*3-dimensional picture matrix, that is, data input into the initial feature extraction model is the picture data.

Further, in the embodiment of the disclosure, the initial feature extraction model may be a convolutional neural network (CNN). The initial feature extraction model is trained to obtain the target feature extraction model which is a model subjected to picture feature extraction finally, thus in-depth features at a semantic level of the picture may be obtained according to the target feature extraction model.

It should be noted that in the embodiment of the disclosure, the target feature extraction model may be a trained CNN model having a strong learning capability and generalization capability, and the picture may be processed by using the CNN model to characterize in-depth features at a semantic level of the picture.

In operation 102, an initial clustering model is trained with second training data, to obtain a first clustering model.

In the embodiment of the disclosure, the device for picture coding may be further configured to train the initial clustering model with the second training data, to obtain the first clustering model.

It may be understood that in the embodiment of the disclosure, the second training data refers to data for training the initial clustering model, and may be an expression vector of the picture, for example, a 256-dimensional expression vector of the picture. That is, data input into the initial clustering model is the expression vector of picture.

Further, in the embodiment of the disclosure, the initial clustering model is a product quantization (PQ). The initial clustering model may be trained to obtain first clustering model, so that feature information may be reduced in dimension according to the first clustering model so as to speed up picture coding.

It should be noted that in the embodiment of the disclosure, the first clustering model may be a trained PQ model generally for picture retrieval, of which the specific implementation may be divided into a grouping quantization process and a Cartesian product process of a category. In the disclosure, a PQ algorithm originally used in a field of picture retrieval is used to implement picture coding, and the coding speed may be greatly improved.

In operation 103, picture coding is performed on picture data according to the target feature extraction model and the first clustering model, to obtain coded data corresponding to the picture data.

In the embodiment of the disclosure, after training the initial feature extraction model with the first training data to obtain the target feature extraction model, and training the initial clustering model with the second training data to obtain the first clustering model, the device for picture coding may be configured to perform picture coding on the picture data according to the target feature extraction model and the first clustering model, to obtain the coded data corresponding to the picture data.

It should be noted that in the embodiment of the disclosure, picture coding refers to a technology in which a picture of an input model is coded, and through picture coding according to the disclosure, the finally obtained codes for the picture has a good capability of characterizing the picture.

It may be understood that in the embodiment of the disclosure, the target feature extraction model and the first clustering model obtained through training may be applied to picture coding directly, to obtain the coded data corresponding to the picture data.

Further, in the embodiment of the disclosure, the operation of performing picture coding on the picture data according to the target feature extraction model and the first clustering model, mainly includes the following three processes. Feature extraction is performed on picture data by using the target feature extraction model; then, clustering is performed by using the first clustering model; finally, clustering is performed again by using the second clustering model.

Figure 2:
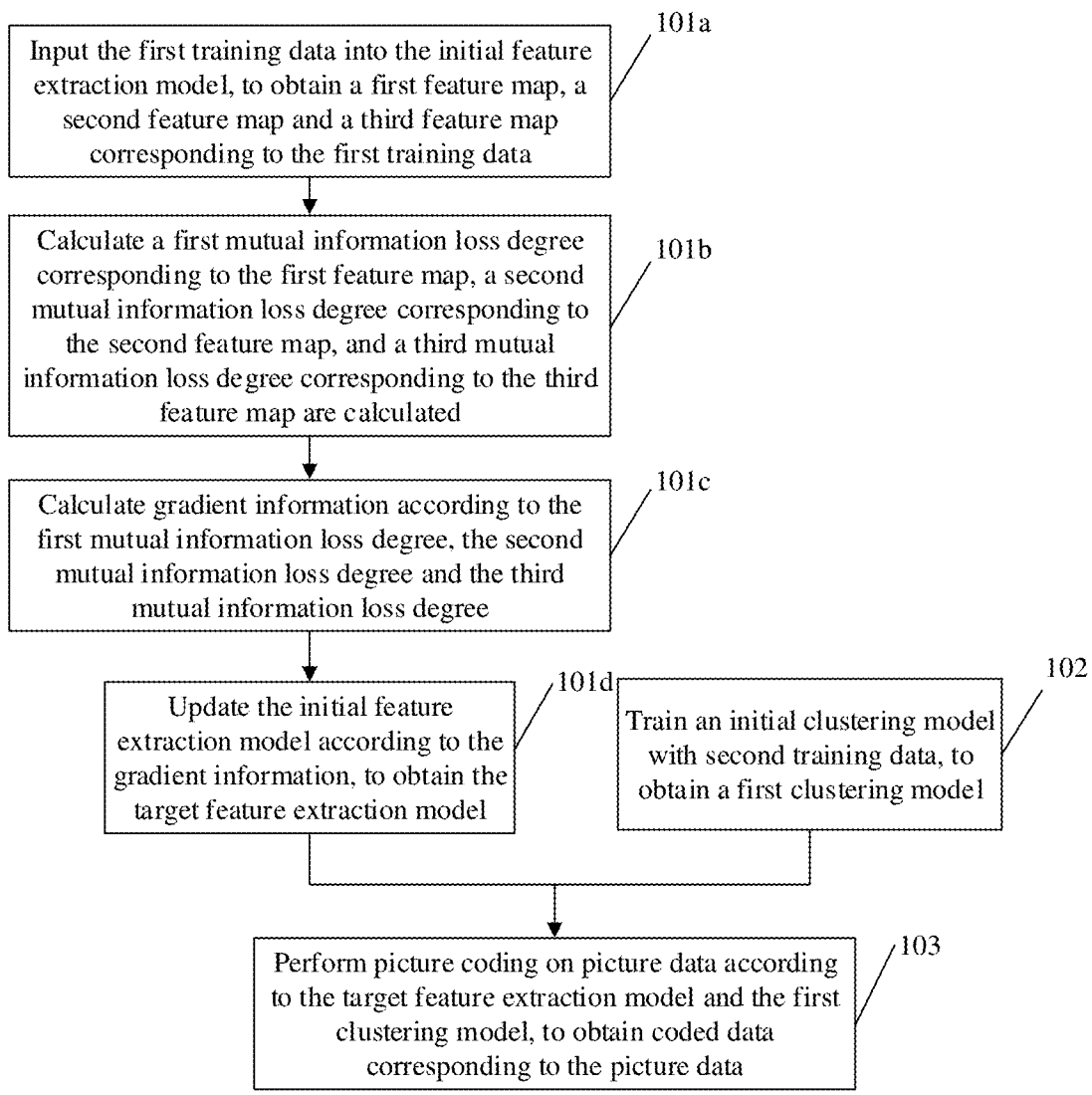
FIG. 2 is a second schematic flowchart of implementation of a method for picture coding according to an embodiment of the disclosure.

FIG. 2 is a second schematic flowchart of implementation of a method for picture coding according to an embodiment of the disclosure. As shown in FIG. 2, the operation of training the initial feature extraction model with the first training data, to obtain the target feature extraction model, that is, the operation 101 may include the following operations.

In operation 101*a*, the first training data is input into the initial feature extraction model, to obtain a first feature map, a second feature map and a third feature map corresponding to the first training data.

In the embodiment of the disclosure, the device for picture coding is configured to train the initial feature extraction model with the first training data, to obtain the target feature extraction model. Specifically, the device for picture coding is configured to firstly input the first training data into the initial feature extraction model, to obtain the first feature map, the second feature map and the third feature map corresponding to the first training data.

It should be noted that in the embodiment of the disclosure, the first feature map, the second feature map and the third feature map refer to data obtained by performing convolution and pooling on the initial feature extraction model. Here the first feature map refers to data information obtained by performing convolution processing and pooling on the first training data, the second feature map refers to data information obtained by continuing to perform convolution and pooling based on the first feature map, and similarly, the third feature map refers to data information obtained by performing convolution and pooling again based on the second feature map. Changes in spatial dimensions of the first feature map, the second feature map, and the third feature map tend to decrease.

In operation 101*b*, a first mutual information loss degree corresponding to the first feature map, a second mutual information loss degree corresponding to the second feature map, and a third mutual information loss degree corresponding to the third feature map are calculated.

In the embodiment of the disclosure, the device for picture coding may be configured to calculate the first mutual information loss degree corresponding to the first feature map, the second mutual information loss degree corresponding to the second feature map, and the third mutual information loss degree corresponding to the third feature map, after inputting the first training data into the initial feature extraction model, to obtain the first feature map, the second feature map and the third feature map corresponding to the first training data.

It should be noted that in the embodiment of the disclosure, the mutual information refers to information content of the feature map obtained by the convolution and pooling with respect to an input picture, and may be divided into global mutual information and local mutual information. For example, in the disclosure, the first mutual information obtained according to the first feature map and the second mutual information obtained according to the second feature map belong to the local mutual information, while the third mutual information obtained according to the third feature map belongs to the global mutual information. In the disclosure, when the sum of the global mutual information and the local mutual information is sufficiently large, it indicates that an output feature map may characterize feature information of the input first training data well.

It may be understood that in the embodiment of the disclosure, the mutual information loss degree corresponding to the feature map may be calculated according to the mutual information, after the mutual information of the feature map is obtained, that is, the first mutual information loss degree corresponding to the first feature map, the second mutual information loss degree corresponding to the second feature map, and the third mutual information loss degree corresponding to the third feature map may be calculated. In the disclosure, the mutual information loss degree is intended to calculate gradient information. The mutual information loss degree may characterize an information loss degree of the feature map subjected to feature extraction with respect to the input picture.

It may also be understood that in the embodiment of the disclosure, when the mutual information loss degree gradually tends to converge, that is, does not change substantially, the training may be stopped.

In operation 101*c*: gradient information is calculated according to the first mutual information loss degree, the second mutual information loss degree and the third mutual information loss degree.

In the embodiment of the disclosure, the device for picture coding may be configured to calculate the gradient information according to the first mutual information loss degree, the second mutual information loss degree and the third mutual information loss degree, after calculating the first mutual information loss degree corresponding to the first feature map, the second mutual information loss degree corresponding to the second feature map, and the third mutual information loss degree corresponding to the third feature map.

It may be understood that in the embodiment of the disclosure, when the initial feature extraction model is being trained, a model updating method adopts a gradient descent algorithm, of which the core is to calculate gradient information, and then update the initial feature extraction model according to the gradient information.

In operation 101*d*, the initial feature extraction model is updated according to the gradient information, to obtain the target feature extraction model.

In the embodiment of the disclosure, the device for picture coding may be configured to update the initial feature extraction model according to the gradient information, to obtain the target feature extraction model, after calculating the gradient information according to the first mutual information loss degree, the second mutual information loss degree and the third mutual information loss degree.

It may be understood that in the embodiment of the disclosure, each time the initial feature extraction model is updated, the gradient information is calculated accordingly, and then model parameters are updated according to each corresponding component in the gradient information, to obtain the target feature extraction model finally.

Figure 3:
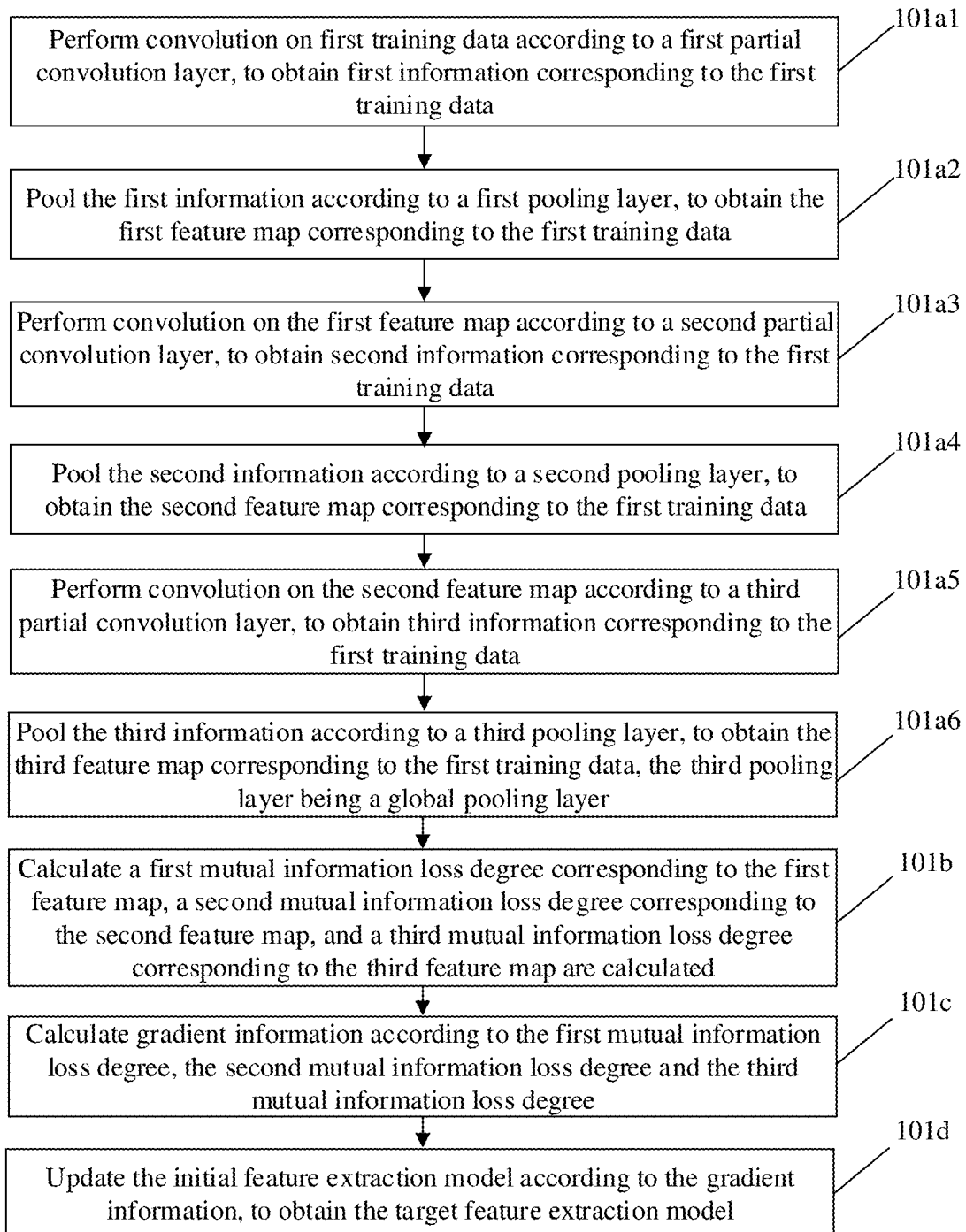
FIG. 3 is a third schematic flowchart of implementation of a method for picture coding according to an embodiment of the disclosure.

FIG. 3 is a third schematic flowchart of implementation of a method for picture coding according to an embodiment of the disclosure. As shown in FIG. 3, the operation that the device for picture coding inputs the first training data into the initial feature extraction model, to obtain the first feature map, the second feature map and the third feature map corresponding to the first training data, that is, the operation 101*a* may include the following operations.

In operation 101*a*1, convolution is performed on the first training data according to a first partial convolution layer, to obtain first information corresponding to the first training data.

In the embodiment of the disclosure, the device for picture coding is configured to input the first training data into the initial feature extraction model, to obtain the first feature map, the second feature map and the third feature map corresponding to the first training data. Specifically, the device for picture coding is configured to firstly perform convolution on the first training data according to the first partial convolution layer, to obtain the first information corresponding to the first training data.

It may be understood that in the embodiment of the disclosure, since the initial feature extraction model is a CNN model, of which the core is to perform feature extraction on input data through a convolution layer, the function of the convolution layer is intended to perform feature extraction.

It should be noted that in the embodiment of the disclosure, the first partial convolution layer includes at least one convolution layer, that is, the first partial convolution layer may include multiple convolution layers, and a size of each of the convolution layers is 3*3 convolution, so that the number of convolution processes performed by using each of the convolution layers becomes multiple times correspondingly. The first information corresponding to the first training data may be obtained after the first training data is subjected to convolution by the first partial convolution layer finally.

It may be understood that in the embodiment of the disclosure, the first information refers to data information obtained through convolution on the first training data.

In operation 101a2, the first information is pooled according to a first pooling layer, to obtain the first feature map corresponding to the first training data.

In the embodiment of the disclosure, the device for picture coding may be configured to pool the first information according to the first pooling layer, to obtain the first feature map corresponding to the first training data, after convolution on the first training data according to the first partial convolution layer to obtain the first information corresponding to the first training data.

It may be understood that in the embodiment of the disclosure, adding the pooling layer to the initial feature extraction model may speed up calculation and prevent over-fitting, that is, a primary function of the pooling layer is down-sampling to reduce dimension, remove redundant information and compress features, thereby reducing the amount of calculation. Therefore, the first information may be pooled according to the first pooling layer, after the first information is obtained.

Further, in the embodiment of the disclosure, the first feature map refers to data information obtained after the first information is pooled. For example, the first feature map may be a 4*4*256-dimensional picture matrix.

It should be noted that in the embodiment of the disclosure, the pooling layer may include an average pooling layer, a maximum pooling layer and a global pooling layer. Here the average pooling layer may retain background information, slide on the feature map in the form of a window, and take an average value in the window as a result. After such operation, the feature map may be down-sampled to reduce an over-fitting phenomenon. The maximum pooling layer may extract feature textures to reduce influence of useless information. The global pooling layer is intended to obtain a global context relationship, and does not average in the form of a window, but is averaged in the unit of a feature map. In an embodiment of the disclosure, both the first pooling layer and the second pooling layer are average pooling layers.

In operation 101a3, convolution is performed on the first feature map according to a second partial convolution layer, to obtain second information corresponding to the first training data.

In the embodiment of the disclosure, the device for picture coding may be configured to perform convolution on the first feature map according to the second partial convolution layer, to obtain the second information corresponding to the first training data, after pooling the first information according to the first pooling layer to obtain the first feature map corresponding to the first training data.

It may be understood that in the embodiment of the disclosure, the second partial convolution layer may further include multiple 3*3-sized convolution layers, that is, it may continue to perform convolution on the first feature map according to the second partial convolution layer after the first feature map is obtained, and then the second information corresponding to the first training data is obtained.

It may be understood that in the embodiment of the disclosure, the second information refers to data information obtained through convolution on the second partial convolution layer.

In operation 101a4: the second information is pooled according to a second pooling layer, to obtain the second feature map corresponding to the first training data.

In the embodiment of the disclosure, the device for picture coding may be configured to pool the second information according to the second pooling layer, to obtain the second feature map corresponding to the first training data, after performing convolution on the first feature map according to the second partial convolution layer to obtain the second information corresponding to the first training data.

It may be understood that in the embodiment of the disclosure, similarly, the second information is required to be pooled by using the second pooling layer to obtain the second feature map, after the second information is obtained.

Further, in the embodiment of the disclosure, the second feature map refers to data information obtained after the second information is pooled. For example, the second feature map may be a 2*2*256-dimensional picture matrix.

In operation 101a5, convolution is performed on the second feature map according to a third partial convolution layer, to obtain third information corresponding to the first training data.

In the embodiment of the disclosure, the device for picture coding may be configured to perform convolution on the second feature map according to the third partial convolution layer, to obtain the third information corresponding to the first training data, after pooling to obtain the second feature map corresponding to the first training data according to the second pooling layer, the second information.

It should be noted that in the embodiment of the disclosure, the third partial convolution layer includes multiple 1*1 convolution layers, that is, convolution is performed on the second feature map by using the multiple 1*1 convolution layers to obtain the third information, after the second feature map is obtained.

It may be understood that in the embodiment of the disclosure, the third information refers to data information obtained through convolution on the third partial convolution layer.

In operation 101a6, the third information is pooled according to a third pooling layer, to obtain the third feature map corresponding to the first training data, here the third pooling layer is a global pooling layer.

In the embodiment of the disclosure, the device for picture coding may be configured to pool the third information according to the third pooling layer, to obtain the third feature map corresponding to the first training data, after convolution on the second feature map according to the third partial convolution layer to obtain the third information corresponding to the first training data; here the third pooling layer is the global pooling layer.

It may be understood that in the embodiment of the disclosure, similarly, the third information is required to be pooled by using the third pooling layer to obtain the third feature map, after the third information is obtained, and the third pooling layer is the global pooling layer.

It should be noted that in the embodiment of the disclosure, the third pooling layer is the global pooling layer. Since the global pooling is not averaged in the form of a window, but averaged in the unit of a feature map, output of the feature map subjected to the global pooling is a value. For example, the third feature map obtained by pooling may be a 256-dimensional picture matrix.

Further, in the embodiment of the disclosure, the third feature map is data information finally output by the initial feature extraction model when the initial feature extraction model is trained.

Figure 4:
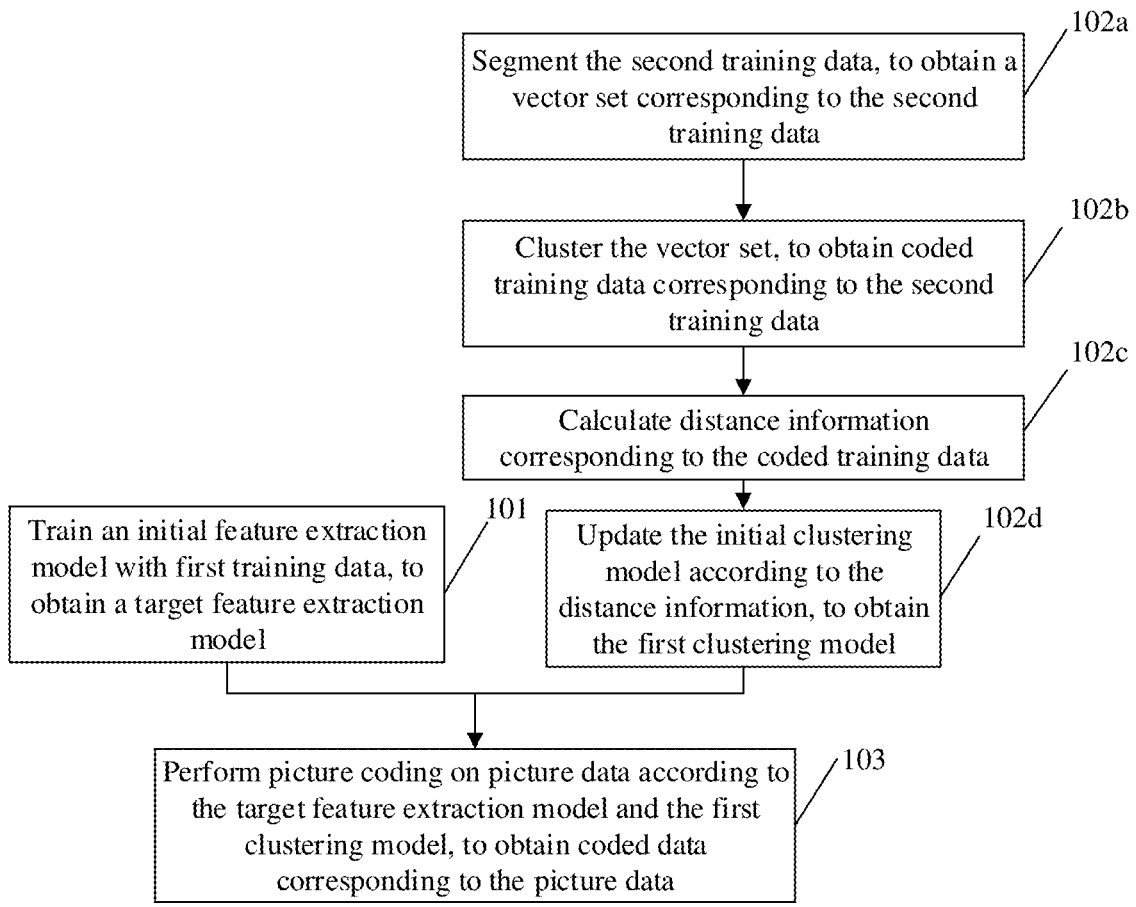
FIG. 4 is a fourth schematic flowchart of implementation of a method for picture coding according to an embodiment of the disclosure.

FIG. 4 is a fourth schematic flowchart of implementation of a method for picture coding according to an embodiment of the disclosure. As shown in FIG. 4, the operation that the device for picture coding trains the initial clustering model with the second training data, to obtain the first clustering model, that is, the operation 102 may include the following operations.

In operation 102a, the second training data is segmented, to obtain a vector set corresponding to the second training data.

In the embodiment of the disclosure, the device for picture coding is configured to train the initial clustering model with the second training data, to obtain the first clustering model. Specifically, the device for picture coding may be configured to firstly segment the second training data, to obtain the vector set corresponding to the second training data.

It should be noted that in the embodiment of the disclosure, segmentation refers to segmenting the second training data. For example, the second training data having a size of 256 dimensions is divided into four segmented 64-dimensional vector sets, which are considered as the vector set corresponding to the second training data.

It should be noted that in the embodiment of the disclosure, the number of segments in the process of segmenting may be set according to specific requirements, and is not specifically limited in the disclosure.

In operation 102b, the vector set is clustered, to obtain coded training data corresponding to the second training data.

In the embodiment of the disclosure, the device for picture coding may be configured to cluster the vector set, to obtain the coded training data corresponding to the second training data, after segmenting the second training data to obtain the vector set corresponding to the second training data.

It should be noted that in the embodiment of the disclosure, clustering is performed in space of each segmented vector set after the vector set is obtained; while in the process of clustering, a k-means clustering algorithm may be used. For example, in the process of clustering training four segmented 64-dimensional vector sets, each segmented 64-dimensional vector set is subjected to clustering training to obtain a 8-bit codebook, each of which includes 256 codes, and the 256 codes may be mapped to a clustering center point of 256 64-dimensional vector sets, which causes a certain accuracy loss, but greatly improves the training speed. Accordingly, the four 8-bit codebooks are the coded training data corresponding to the second training data.

In operation 102c, distance information corresponding to the coded training data is calculated.

In the embodiment of the disclosure, the device for picture coding may be configured to calculate the distance information corresponding to the coded training data, after clustering the vector set, to obtain the coded training data corresponding to the second training data.

It should be noted that in the embodiment of the disclosure, for the initial clustering model, i.e., the PQ algorithm, an objective function is a distance between a sample and a class center. Therefore, in the embodiment of the disclosure, the distance information is a distance between the second training data and the coded data, thus the initial clustering model is updated according to the distance information which is continuously iteratively calculated.

In operation 102d, the initial clustering model is updated according to the distance information, to obtain the first clustering model.

In the embodiment of the disclosure, the device for picture coding is configured to update the initial clustering model according to the distance information, to obtain the first clustering model, after calculating the distance information corresponding to the coded training data.

It should be noted that in the embodiment of the disclosure, the process of training the initial clustering model reaches the purpose of updating the objective function by continuously iteratively calculating the distance information, thus the initial clustering model is updated and finally the first clustering model is obtained.

Figure 5:
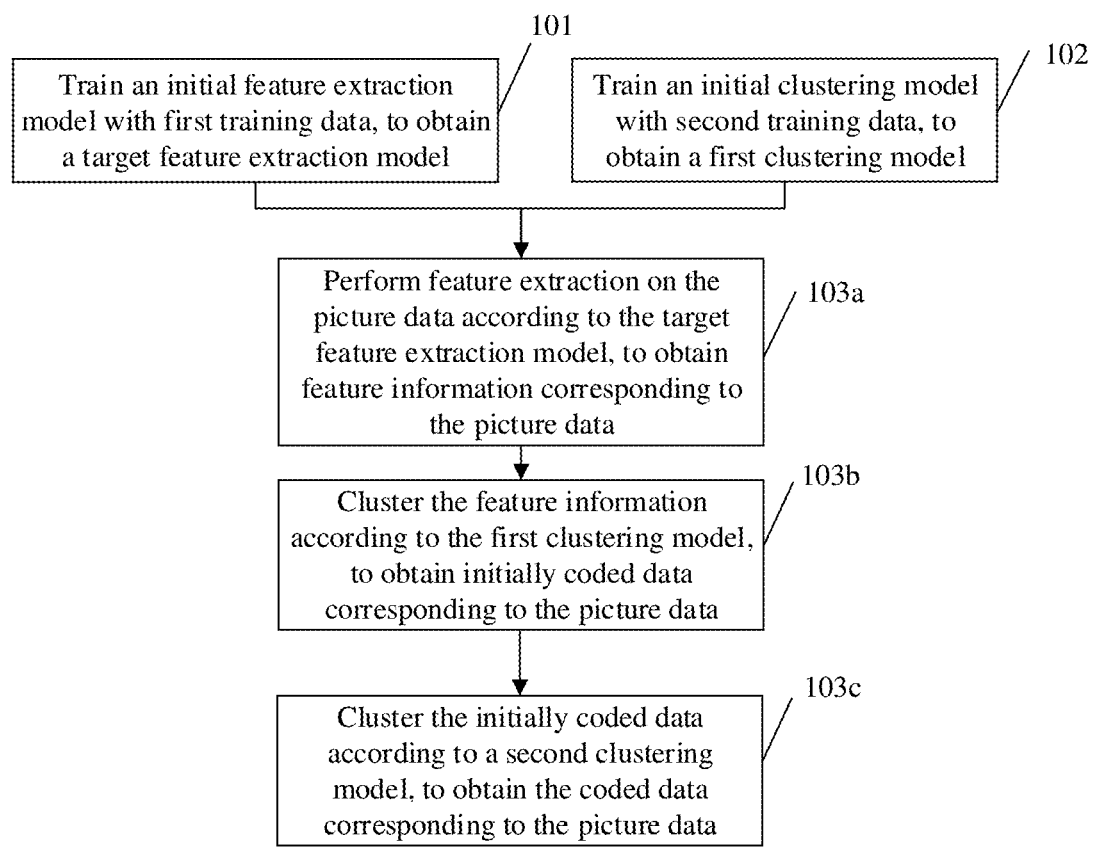
FIG. 5 is a fifth schematic flowchart of implementation of a method for picture coding according to an embodiment of the disclosure.

FIG. 5 is a fifth schematic flowchart of implementation of a method for picture coding according to an embodiment of the disclosure. As shown in FIG. 5, the operation that the device for picture coding performs picture coding on the picture data according to the target feature extraction model and the first clustering model, to obtain the coded data corresponding to the picture data, that is, the operation 103 may include the following operations.

In operation 103a, feature extraction is performed on picture data according to the target feature extraction model, to obtain feature information corresponding to the picture data.

In the embodiment of the disclosure, the device for picture coding is configured to perform picture coding on the picture data according to the target feature extraction model and the first clustering model, to obtain the coded data corresponding to the picture data. Specifically, the device for picture coding is configured to firstly perform feature extraction on the picture data according to the target feature extraction model, to obtain feature information corresponding to the picture data.

It should be noted that in the embodiment of the disclosure, after model training is completed, when specific picture coding is implemented by the trained model, the trained target feature extraction model may be used firstly to perform feature extraction on the picture data.

It may be understood that in the embodiment of the disclosure, the picture data is data of the input target feature extraction model, that is, the picture data is original picture data to be subjected to picture coding by using the model.

Further, in the embodiment of the disclosure, the feature information is information obtained after the feature extraction is performed on picture data, and may characterize features of the picture data, i.e., in-depth features at a semantic level of the picture, to the most extent.

In operation 103b, the feature information is clustered according to the first clustering model, to obtain initially coded data corresponding to the picture data.

In the embodiment of the disclosure, the device for picture coding may be configured to cluster the feature information according to the first clustering model, to obtain the initially coded data corresponding to the picture data, after perform feature extraction on the picture data according to the target feature extraction model to obtain the feature information corresponding to the picture data.

It may be understood that in the embodiment of the disclosure, the initially coded data is coded data corresponding to the picture data obtained by clustering. For example, when hundreds of millions of 256-dimensional vectors existing in an e-commerce scenario are clustered by using the first clustering model, the hundreds of millions of 256-dimensional vectors may be converted to millions of coded data, so that picture coding speed may be greatly improved.

It should be noted that in the embodiment of the disclosure, the initially coded data corresponds to a coarse-grained cluster set, and a final result of picture coding in the disclosure is composite codes obtained based on the initially coded data.

In operation 103c: the initially coded data is clustered according to a second clustering model, to obtain the coded data corresponding to the picture data.

In the embodiment of the disclosure, the device for picture coding may be configured to cluster the initially coded data according to the second clustering model, to obtain the coded data corresponding to the picture data, after clustering the feature information according to the first clustering model, to obtain the initially coded data corresponding to the picture data.

It should be noted that in the embodiment of the disclosure, after the feature information is clustered by using the first clustering model, picture coding speed may be greatly improved. However, in the embodiment of the disclosure, in order to obtain picture coding with a stronger recognition capability, it is required to cluster the initially coded data by using the second clustering model based on the clustering by using the first clustering model, so that accuracy compensation may be performed.

In the embodiment of the disclosure, the second clustering model is a Balanced Iterative Reducing and Clustering Using Hierarchies (BIRCH) algorithm. The BIRCH algorithm is usually used for picture retrieval, which does not require to specify the number of clustering centers and has a fast computation speed. In the disclosure, the BIRCH algorithm is used as the second clustering model, which may further improve picture coding accuracy.

It should be noted that in the embodiment of the disclosure, since the initially coded data corresponds to a coarse-grained cluster set, a fine-grained cluster may be obtained by clustering the initially coded data according to the second clustering model, so that the coarse-grained cluster set and the fine-grained cluster are combined to obtain the finally coded data.

In the embodiment of the disclosure, the operation that the device for picture coding performs feature extraction on the picture data according to the target feature extraction model, to obtain the feature information corresponding to the picture data, that is, the operation 103a may include the following operations.

In operation 103a1, convolution is performed on the picture data according to a first partial convolution layer, to obtain fourth information corresponding to the picture data.

In the embodiment of the disclosure, the device for picture coding is configured to perform feature extraction on the picture data according to the target feature extraction model, to obtain the feature information corresponding to the picture data. Specifically, the device for picture coding may be configured to firstly perform convolution on the picture data according to the first partial convolution layer, to obtain the fourth information corresponding to the picture data.

It may be understood that in the embodiment of the disclosure, when feature extraction is performed on picture data by using the target feature extraction model, all the convolution layers are trained and determined convolution layers, that is, setting of related parameters in the convolution layers has been determined. In the embodiment of the disclosure, firstly, convolution is performed on the picture data by using the determined first partial convolution layer to obtain the fourth information. Further, the fourth information is data information obtained through convolution on the picture data according to the determined first partial convolution layer.

In operation 103a2, the fourth information is pooled according to a first pooling layer, to obtain a fourth feature map corresponding to the picture data.

In the embodiment of the disclosure, the device for picture coding may be configured to pool the fourth information according to the first pooling layer, to obtain the fourth feature map corresponding to the picture data, after convolution on the picture data according to the first partial convolution layer, to obtain the fourth information corresponding to the picture data.

It may be understood that in the embodiment of the disclosure, when feature extraction is performed on picture data by using the target feature extraction model, the pool layer used for pooling is a trained and determined pool layer. In the embodiment of the disclosure, after the fourth information corresponding to the picture data is obtained, the fourth information is pooled by using the determined first pooling layer, to obtain the fourth feature map.

In operation 103a3, convolution is performed on the fourth feature map according to a second partial convolution layer, to obtain fifth information corresponding to the picture data.

In the embodiment of the disclosure, the device for picture coding may be configured to perform convolution on the fourth feature map according to the second partial convolution layer, to obtain the fifth information corresponding to the picture data, after pooling the fourth information according to the first pooling layer, to obtain the fourth feature map corresponding to the picture data.

Further, the fifth information is data information obtained through convolution according to the determined second partial convolution layer.

In operation 103a4, the fifth information is pooled according to a second pooling layer, to obtain a fifth feature map corresponding to the picture data.

In the embodiment of the disclosure, the device for picture coding may pool the fifth information according to the second pooling layer, to obtain the fifth feature map corresponding to the picture data, after convolution on the fourth feature map according to the second partial convolution layer to obtain the fifth information corresponding to the picture data.

In operation 103a5, convolution is performed on the fifth feature map according to a third partial convolution layer, to obtain sixth information corresponding to the picture data.

In the embodiment of the disclosure, the device for picture coding may be configured to perform convolution on the fifth feature map according to the third partial convolution layer, to obtain the sixth information corresponding to the picture data, after pooling the fifth information according to the second pooling layer to obtain the fifth feature map corresponding to the picture data.

Further, the sixth information is data information obtained through convolution according to the determined third partial convolution layer.

In operation 103a6, the sixth information is pooled according to a third pooling layer, to obtain the feature information corresponding to the picture data; here the third pooling layer is a global pooling layer.

In the embodiment of the disclosure, the device for picture coding may be configured to pool the sixth information according to the third pooling layer, to obtain the feature information corresponding to the picture data, after convolution on the fifth feature map according to the third partial convolution layer to obtain the sixth information corresponding to the picture data; here the third pooling layer is the global pooling layer.

It should be noted that in the embodiment of the disclosure, after convolution by using the last partial convolution layer, i.e., the third partial convolution layer, all the convolution operations on the picture data have been completed, that is, feature extraction of the picture data has been completed. Further, the data information obtained after pooling the sixth information by using the third pooling layer is the feature information obtained by feature extracting according to the target feature extraction model.

Figure 6:
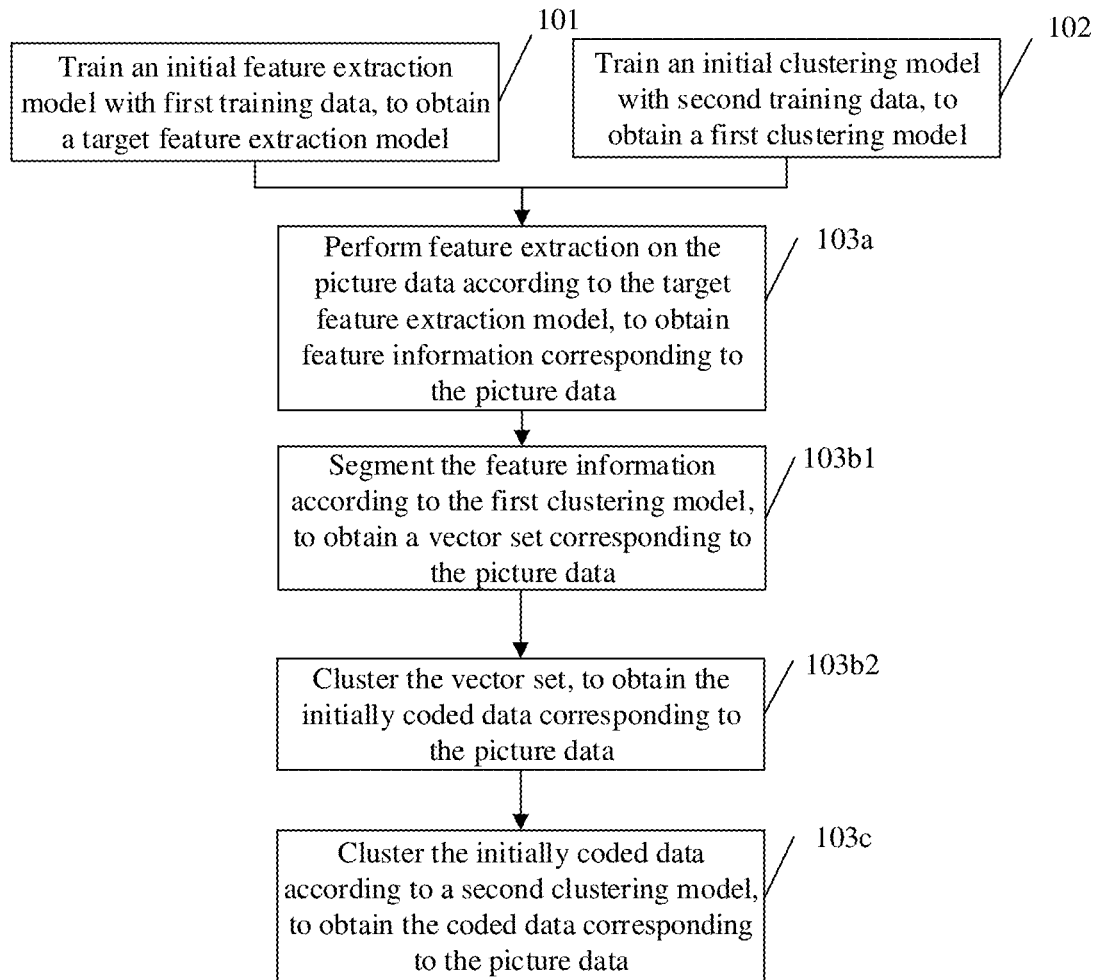
FIG. 6 is a sixth schematic flowchart of implementation of a method for picture coding according to an embodiment of the disclosure.

FIG. 6 is a sixth schematic flowchart of implementation of a method for picture coding according to an embodiment of the disclosure. As shown in FIG. 6, in the embodiment of the disclosure, the operation that the device for picture coding clusters the feature information according to the first clustering model, to obtain the initially coded data corresponding to the picture data, that is, the operation 103b may include the following operations.

In operation 103b1: the feature information is segmented according to the first clustering model, to obtain a vector set corresponding to the picture data.

In the embodiment of the disclosure, the device for picture coding is configured to cluster the feature information according to the first clustering model, to obtain the initially coded data corresponding to the picture data. Specifically, the device for picture coding may be configured to firstly segment the feature information according to the first clustering model, to obtain the vector set corresponding to the picture data.

It may be understood that in the embodiment of the disclosure, the feature information is segmented by using the trained first clustering model, to perform clustering according to the obtained vector set.

In operation 103b2, the vector set is clustered, to obtain the initially coded data corresponding to the picture data.

In the embodiment of the disclosure, the device for picture coding may be configured to cluster the vector set, to obtain the initially coded data corresponding to the picture data, after segmenting the feature information according to the first clustering model to obtain the vector set corresponding to the picture data.

It may be understood that in the embodiment of the disclosure, the initially coded data is a coarse-grained cluster set. For example, the initially coded data may be represented as four 8-bit codes: 001 128 233 255.

Figure 7:
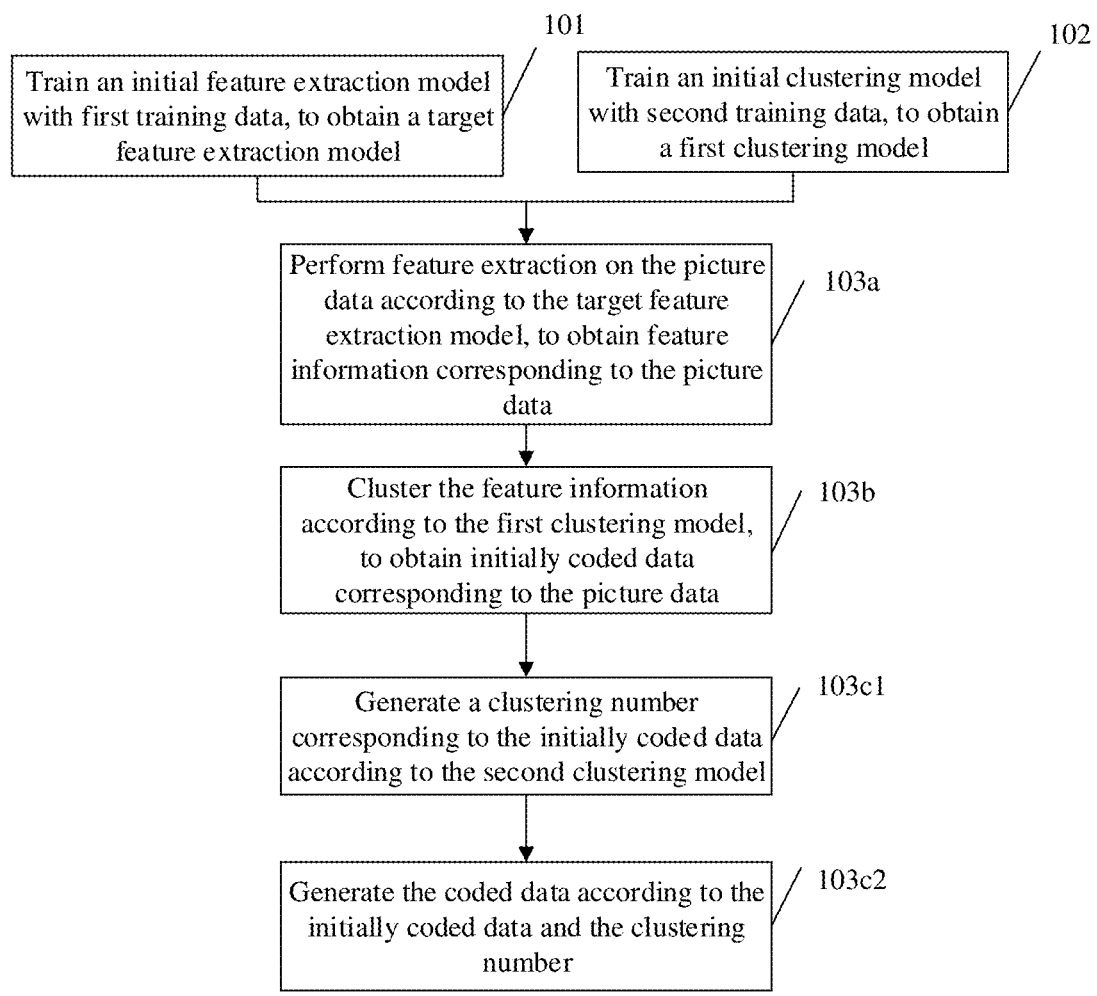
FIG. 7 is a seventh schematic flowchart of implementation of a method for picture coding according to an embodiment of the disclosure.

FIG. 7 is a seventh schematic flowchart of implementation of a method for picture coding according to an embodiment of the disclosure. As shown in FIG. 7, in the embodiment of the disclosure, the operation that the device for picture coding clusters the initially coded data according to the second clustering model, to obtain the coded data corresponding to the picture data, that is, the operation 103c may include the following operations.

In operation 103c1, a clustering number corresponding to the initially coded data is generated according to the second clustering model.

In the embodiment of the disclosure, the device for picture coding is configured to cluster the initially coded data according to the second clustering model, to obtain the coded data corresponding to the picture data. Specifically, the device for picture coding is configured to generate a clustering number corresponding to the initially coded data according to the second clustering model.

It should be noted that in the embodiment of the disclosure, the clustering number refers to a number generated by the second clustering model for the initially coded data, and is a fine-grained cluster. For example, when the initially coded data is represented as a character string 001 128 233 255, the clustering number generated from the initially coded data may be represented as 188.

In operation 103c2, the coded data is generated according to the initially coded data and the clustering number.

In the embodiment of the disclosure, the device for picture coding is configured to generate the coded data according to the initially coded data and the clustering number, after generating the clustering number corresponding to the initially coded data according to the second clustering model.

It may be understood that in the embodiment of the disclosure, the coded data is composite codes generated by combining the initially coded data and the clustering number, and may represent the picture data correspondingly, so that the picture data may be recognized based on the coded data, improving efficiency of recognizing the picture data.

Figure 8:
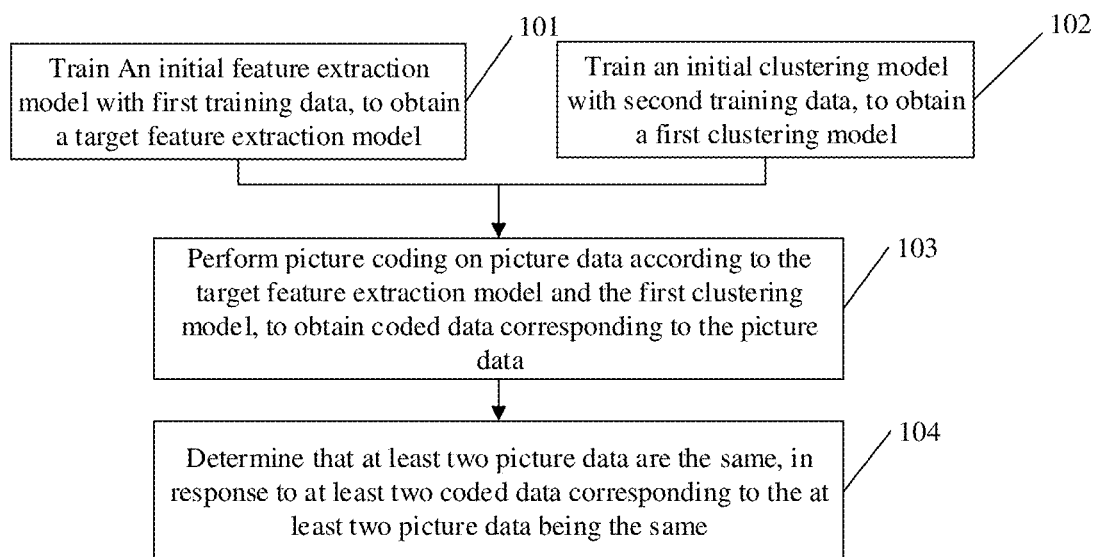
FIG. 8 is an eighth schematic flowchart of implementation of a method for picture coding according to an embodiment of the disclosure.

Further, in the embodiment of the disclosure, FIG. 8 is an eighth schematic flowchart of implementation of a method for picture coding according to an embodiment of the disclosure. As shown in FIG. 8, the method may further include the following operations after the operation that the device for picture coding performs picture coding on the picture data according to the target feature extraction model and the first clustering model, to obtain the coded data corresponding to the picture data, that is, the operation 103.

In operation 104, it is determined that at least two picture data are the same, in response to at least two coded data corresponding to the at least two picture data being the same.

In the embodiment of the disclosure, the device for picture coding is configured to determine that at least two picture data are the same, in response to at least two coded data corresponding to the at least two picture data being the same, after the second clustering model clusters the initially coded data, to obtain the coded data corresponding to the picture data.

It may be understood that in the embodiment of the disclosure, each picture data corresponds to one piece of coded data, and the corresponding picture data may be recognized according to the coded data. Therefore, it may be determined that at least two picture data are the same figure, in response to at least two coded data corresponding to the at least two picture data are the same.

Further, in the embodiment of the disclosure, when it is determined in an e-commerce scenario that the corresponding picture data is the same according to at least two coded data, cheating may be suppressed on pictures which are sorted backward, and pictures which may has a suspicion of cheating may be shifted backward when sorting, and even not appear on the search result page. Therefore, it may effectively determine whether a suspicion of cheating or plagiarism exists in the picture data based on picture coding, thus improving the capability of recognizing pictures.

An embodiment of the disclosure provides a method for picture coding in which an initial feature extraction model is trained by a device for picture coding with first training data, to obtain a target feature extraction model; an initial clustering model is trained by the device for picture coding with second training data, to obtain a first clustering model; and picture coding is performed on picture data by the device for picture coding according to the target feature extraction model and the first clustering model, to obtain coded data corresponding to the picture data. That is, in the embodiment of the disclosure, the device for picture coding is configured to obtain the target feature extraction model and the first clustering model by training the initial feature extraction model and the initial clustering model, and then implement coding of the picture data according to the target feature extraction model and the first clustering model, so that the coded data has better capability of expressing features. As can be seen, the target feature extraction model and the first clustering model created by the disclosure has better capability of picture coding, improving the capability of recognizing pictures.

Second Embodiment

Figure 9:
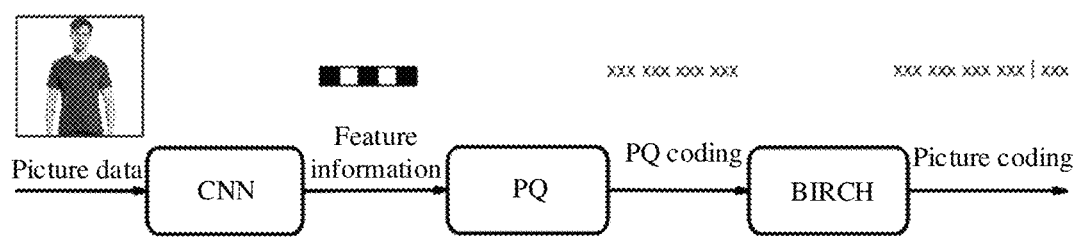
FIG. 9 is a first schematic diagram of implementation architecture of a method for picture coding according to an embodiment of the disclosure.

In another embodiment of the disclosure, exemplarily, FIG. 9 is a first schematic diagram of implementation architecture of a method for picture coding according to an embodiment of the disclosure. As shown in FIG. 9, in the embodiment of the disclosure, when the picture data is coded, picture coding process may be as follows. Firstly, the picture data is CNN; feature information of a hidden layer is processed according to the PQ algorithm to obtain PQ codes, after the feature information of the hidden layer is obtained, and in this process, hundreds of millions of feature information of the hidden layer may be mapped to millions of PQ codes; then the PQ codes are processed according to the BIRCH algorithm, to finally obtain composite codes consisting of PQ codes and clustering numbers, and in this process, millions of PQ codes may be mapped to tens of millions of composite codes, that is, the entire picture coding process may finally map hundreds of millions of pictures to tens of millions of composite codes, which are the final picture codes.

Figure 10:
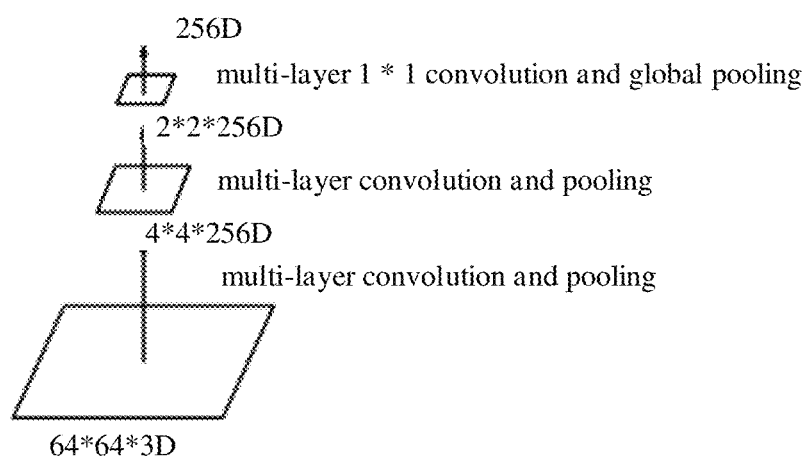
FIG. 10 is a second schematic diagram of implementation architecture of a method for picture coding according to an embodiment of the disclosure.

Exemplarily, FIG. 10 is a second schematic diagram of implementation architecture of a method for picture coding according to an embodiment of the disclosure. As shown in FIG. 10, the CNN model in the embodiment of the disclosure may be divided into three segmented convolution layers, each of which may include multiple convolution layers, for example, multiple 3*3 convolution layers, but the last segmented convolution layer includes multiple 1*1 convolution layers, and a pooling layer is provided after each segmented convolution layer, here the last pooling layer is a global pool layer. When a 64*64*3-dimensional picture matrix is input into the CNN model in the disclosure, the picture matrix may be subjected to the multi-layer convolution and pooling of the first segmented convolution layer and the pooling layer, to obtain a 4*4*256-dimensional feature map. Then, the 4*4*256-dimensional feature map may be subjected to the multi-layer convolution and pooling of the second segmented convolution layer and the pooling layer, to obtain a 2*2*256-dimensional feature map. Finally, the 2*2*256-dimensional feature map may be subjected to convolution of the multi-layer 1*1 convolution layer and global pooling of the global pooling layer, to obtain a 256-dimensional feature map. That is, the CNN model in the disclosure may include two intermediate layers, i.e., the 4*4*256-dimensional feature map and the 2*2*256-dimensional feature map, and finally, it is required to calculate mutual information losses of the 4*4*256-dimensional feature map, the 2*2*256-dimensional feature map and the 256-dimensional feature map with respect to the input picture matrix; here, the mutual information losses of the 4*4*256-dimensional feature map and the 2*2*256-dimensional feature map are local mutual information, and the mutual information loss of the 256-dimensional feature map is global mutual information. This makes introduction of the local mutual information richer and enhances robustness of the CNN model.

Figure 11:
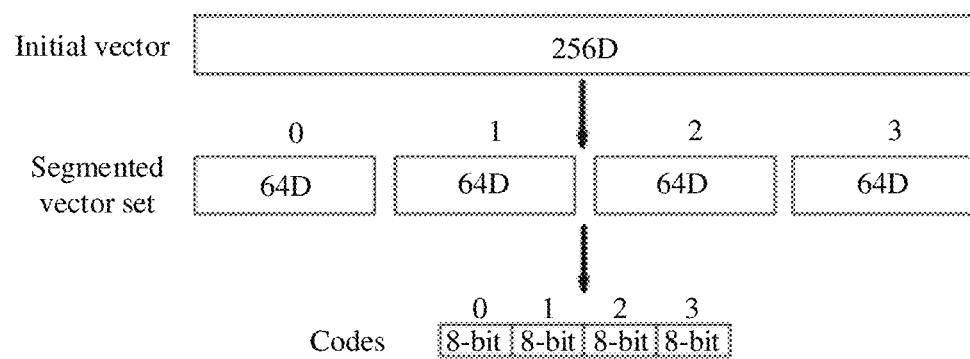
FIG. 11 is a third schematic diagram of implementation architecture of a method for picture coding according to an embodiment of the disclosure.

Exemplarily, FIG. 11 is a third schematic diagram of implementation architecture of a method for picture coding according to an embodiment of the disclosure. As shown in FIG. 11, in the embodiment of the disclosure, the process of coding feature of a CNN hidden layer by using the PQ algorithm may be as follows. Firstly, vector segmentation is performed on an initial vector of the feature of the CNN hidden layer, to divide the 256-dimensional initial vector into four 64-dimensional vector sets, and each of the 64-dimensional vector sets is searched thorough to obtain the nearest center point, to obtain four 8-bit codes. The codes may be represented in the form of a character string as splicing of four 0-255 integer character strings, for example, "001 128 233 255".

Exemplarily, the method for picture coding according to the embodiment of the disclosure is applied to an e-commerce scenario for experiment, and effectiveness of the method for picture coding according to the embodiment of the disclosure is verified by the experimental result generated in the e-commerce scenario. Table 1 is the experimental result generated by applying the method for picture coding according to the embodiment of the disclosure to a certain e-commerce scenario. The picture is recognized based on the picture coding technology of the disclosure, and then search results having a suspicion of cheating the same picture are subjected to weight reduction and suppression. As shown in Table 1, where "search UV value" represents average order amount generated by each search user, the higher the better; "search UCVR" represents average number of order lines generated by each search user, the higher the better; "search UCTR" represents average number of search result clicks generated by each search user, the higher the better; "average click position for an order" represents an average position of each search user ordering an item in the search result page, the lower the better. As can be seen, the picture coding technology according to the embodiment of the disclosure has a stronger capability of recognizing pictures, and may have a positive impact on the search value benefit and the user experience.

TABLE 1

| Search UV value | Search UCVR | Search UCTR | Average click position for an order |
|---|---|---|---|
| +2.98% | +1.08% | +0.22% | −0.32% |

An embodiment of the disclosure provides a method for picture coding in which an initial feature extraction model is trained by an device for picture coding with first training data, to obtain a target feature extraction model; an initial clustering model is trained by the device for picture coding with second training data, to obtain a first clustering model; and picture coding is performed on picture data by the device for picture coding according to the target feature extraction model and the first clustering model, to obtain coded data corresponding to the picture data. That is, in the embodiment of the disclosure, the device for picture coding is configured to obtain the target feature extraction model and the first clustering model by training the initial feature extraction model and the initial clustering model, and then implement coding of the picture data according to the target feature extraction model and the first clustering model, so that the coded data has better capability of expressing features. As can be seen, the target feature extraction model and the first clustering model created by the disclosure has better capability of picture coding, and the capability of recognizing pictures is improved.

Third Embodiment

Figure 12:
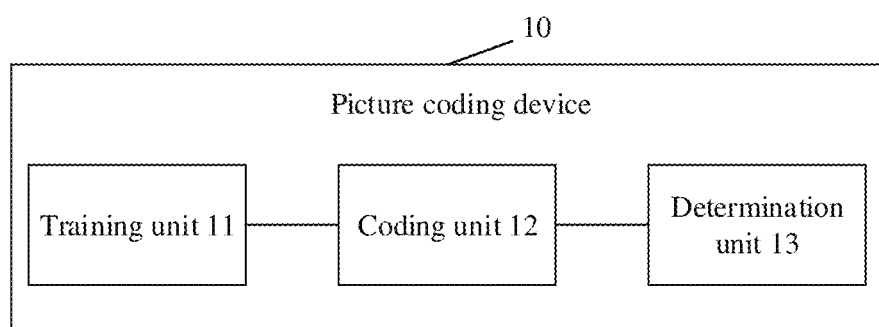
FIG. 12 is a first schematic diagram of structure of a device for picture coding according to an embodiment of the disclosure.

Based on the above-described embodiment, in another embodiment of the disclosure, FIG. 12 is a first schematic diagram of compositional structure of a device for picture coding according to an embodiment of the disclosure. As shown in FIG. 12, the device for picture coding 10 according to the embodiment of the disclosure may include a training unit 11, a coding unit 12 and a determination unit 13.

The training unit 11 is configured to train an initial feature extraction model with first training data, to obtain a target feature extraction model, and train an initial clustering model with second training data, to obtain a first clustering model.

The coding unit 12 is configured to perform picture coding on picture data according to the target feature extraction model and the first clustering model, to obtain coded data corresponding to the picture data.

Further, in the embodiment of the disclosure, the training unit 11 is specifically configured to input the first training data into the initial feature extraction model, to obtain a first feature map, a second feature map and a third feature map corresponding to the first training data; calculate a first mutual information loss degree corresponding to the first feature map, a second mutual information loss degree corresponding to the second feature map, and a third mutual information loss degree corresponding to the third feature map; calculate gradient information according to the first mutual information loss degree, the second mutual information loss degree and the third mutual information loss degree; and update the initial feature extraction model according to the gradient information, to obtain the target feature extraction model.

Further, in the embodiment of the disclosure, the training unit 11 is also specifically configured to perform convolution on the first training data according to a first partial convolution layer, to obtain first information corresponding to the first training data; pool the first information according to a first pooling layer, to obtain the first feature map corresponding to the first training data; perform convolution on the first feature map according to a second partial convolution layer, to obtain second information corresponding to the first training data; pool the second information according to a second pooling layer, to obtain the second feature map corresponding to the first training data; perform convolution on the second feature map according to a third partial convolution layer, to obtain third information corresponding to the first training data; and pool the third information according to a third pooling layer, to obtain the third feature map corresponding to the first training data; here the third pooling layer is a global pooling layer.

Further, in the embodiment of the disclosure, the training unit 11 is also specifically configured to segment the second training data, to obtain a vector set corresponding to the second training data; cluster the vector set, to obtain coded training data corresponding to the second training data; calculate distance information corresponding to the coded training data; and update the initial clustering model according to the distance information, to obtain the first clustering model.

The coding unit 12 is configured to perform feature extraction on the picture data according to the target feature extraction model, to obtain feature information corresponding to the picture data; cluster the feature information according to the first clustering model, to obtain initially coded data corresponding to the picture data; and cluster the initially coded data according to a second clustering model, to obtain the coded data corresponding to the picture data.

Further, in the embodiment of the disclosure, the coding unit 12 is specifically configured to perform convolution on the picture data according to a first partial convolution layer, to obtain fourth information corresponding to the picture data; pool the fourth information according to a first pooling layer, to obtain a fourth feature map corresponding to the picture data; perform convolution on the fourth feature map according to a second partial convolution layer, to obtain fifth information corresponding to the picture data; pool the fifth information according to a second pooling layer, to obtain a fifth feature map corresponding to the picture data; perform convolution on the fifth feature map according to a third partial convolution layer, to obtain sixth information corresponding to the picture data; and pool the sixth information according to a third pooling layer, to obtain the feature information corresponding to the picture data; here the third pooling layer is a global pooling layer.

Further, in the embodiment of the disclosure, the coding unit 12 is also specifically configured to segment, according to the first clustering model, the feature information, to obtain a vector set corresponding to the picture data; and cluster the vector set, to obtain the initially coded data corresponding to the picture data.

Further, in the embodiment of the disclosure, the coding unit 12 is also specifically configured to generate, according to the second clustering model, a clustering number corresponding to the initially coded data; and generate, according to the initially coded data and the clustering number, the coded data.

The determination unit 13 is configured to determine that at least two picture data are the same, in response to at least two coded data corresponding to the at least two picture data being the same, after the coding unit 12 performs picture coding on the picture data according to the target feature extraction model and the first clustering model, to obtain the coded data corresponding to the picture data.

Figure 13:
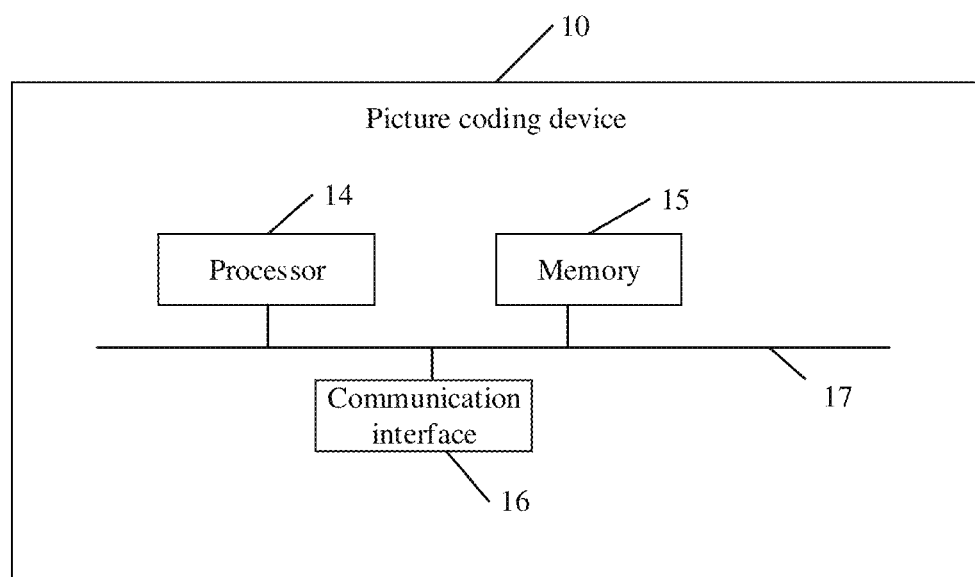
FIG. 13 is a second schematic diagram of structure of a device for picture coding according to an embodiment of the disclosure.

FIG. 13 is a second schematic diagram of compositional structure of an device for picture coding according to an embodiment of the disclosure. As shown in FIG. 13, the device for picture coding 10 according to the embodiment of the disclosure may further include a processor 14 and a memory 15 storing instructions executable by the processor 14. Further, the device for picture coding 10 may further include a communication interface 16 and a bus 17 for connecting the processor 14, the memory 15 and the communication interface 16.

In the embodiment of the disclosure, the processor 14 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, or a microprocessor. It may be understood that the electronic device for implementing functions of the above-described processor for different devices may be another electronic device, which is not specifically limited in the embodiment of the disclosure. The processor 14 may further include the memory 15, which may be connected to the processor 14, here the memory 15 is configured to store executable program codes including computer operation instructions, and the memory 15 may include a high-speed Random-Access Memory (RAM) memory, or may further include a non-volatile memory, such as at least two disk memories.

In the embodiment of the disclosure, the bus 17 is configured to connect the communication interface 16, the processor 14, and the memory 15 and implement mutual communication between these devices.

In the embodiment of the disclosure, the memory 15 is configured to store instructions and data.

Further, in the embodiment of the disclosure, the processor 14 is configured to train an initial feature extraction model with first training data, to obtain a target feature extraction model; train an initial clustering model with second training data, to obtain a first clustering model; and perform picture coding on picture data according to the target feature extraction model and the first clustering model, to obtain coded data corresponding to the picture data.

In a practical application, the above-described memory 15 may be a volatile memory, such as RAM; or a non-volatile memory (non-volatile memory), such as Read-Only Memory (ROM), a flash memory, a Hard Disk Drive (HDD) or a Solid-State Drive (SSD); or a combination of the above-described types of memories and provide instructions and data to the processor 14.

In addition, functional modules in the embodiment may be integrated into one processing unit, or each unit may be physically present independently, or two or more units may be integrated into one unit. The above-described integrated unit may be implemented in the form of hardware or a software function module.

When the integrated unit is implemented in the form of a software functional module and is not sold or used as an independent product, it may be stored in a computer-readable storage medium. Based on such understanding, the technical solution of the embodiment substantially or parts making contributions to the related art or all or part of the technical solution may be embodied in the form of a software product, and the computer software product is stored in a storage medium, including multiple instructions configured to enable a computer device (which may be a personal computer, a server, a network device or the like) or a processor to execute all or part of steps of the method in the embodiment. The abovementioned storage medium includes various media capable of storing program codes such as a U disk, a mobile hard disk, a Read Only Memory (ROM), a RAM, a magnetic disk or an optical disk.

An embodiment of the disclosure provides a device for picture coding configured to train an initial feature extraction model with first training data, to obtain a target feature extraction model; train an initial clustering model with second training data, to obtain a first clustering model; and perform picture coding on picture data according to the target feature extraction model and the first clustering model, to obtain coded data corresponding to the picture data. That is, in the embodiment of the disclosure, the device for picture coding is configured to obtain the target feature extraction model and the first clustering model by training the initial feature extraction model and the initial clustering model, and then implement coding of the picture data according to the target feature extraction model and the first clustering model, so that the coded data has better capability of expressing features. As can be seen, the target feature extraction model and the first clustering model created by the disclosure has better capability of picture coding, and the capability of recognizing pictures is improved.

An embodiment of the disclosure provides a computer-readable storage medium having stored thereon a program which implements the method for picture coding as described above when executed by a processor.

Specifically, program instructions corresponding to a method for picture coding in the embodiment may be stored on a storage medium such as an optical disc, a hard disk, a U disk or the like. When the program instruction corresponding to a method for picture coding in the storage medium is read or executed by an electronic device, the method includes the following operations.

An initial feature extraction model is trained with first training data, to obtain a target feature extraction model.

An initial clustering model is trained with second training data, to obtain a first clustering model.

Picture coding is performed on picture data according to the target feature extraction model and the first clustering model, to obtain coded data corresponding to the picture data.

It should be appreciated by those skilled in the art that the embodiments of the disclosure may be provided as methods, systems or computer program products. Accordingly, the disclosure may take the form of a hardware embodiment, a software embodiment, or an embodiment combining software and hardware aspects. Further, the disclosure may take the form of a computer program product implemented on one or more computer-usable storage media (including, but not limited to, a magnetic disk memory, an optical memory or the like) in which computer-usable program codes are contained.

The disclosure is described with reference to a schematic flowchart and/or block diagram of implementation of a method, a device (system) and a computer program product according to the embodiments of the disclosure. It should be understood that each flow and/or block of the schematic flowchart and/or block diagram, and a combination of flow and/or blocks of the schematic flowchart and/or block diagram, may be implemented by computer program instructions. These computer program instructions may be provided to a processor of a general purpose computer, a dedicated computer, an embedded processor, or another programmable data processing device to generate a machine, such that instructions executed by the processor of the computer or another programmable data processing device generate means for implementing the functions specified in one or more flow of the schematic flowchart and/or one or more blocks of the block diagram.

These computer program instructions may also be stored in a computer-readable memory capable of directing a computer or another programmable data processing device to operate in a particular manner, such that the instructions stored in the computer-readable memory produce articles of manufacture including instruction means that implement the functions specified in one or more flow of the schematic flowchart and/or one or more blocks of the block diagram.

These computer program instructions may also be loaded onto a computer or another programmable data processing device, such that a series of operational steps are performed on the computer or another programmable device to generate computer-implemented processing, and thus the instructions executed on the computer or another programmable device provide steps for implementing the functions specified in one or more flow of the schematic flowchart and/or one or more blocks of the block diagram.

The foregoing description is just a preferred embodiment of the disclosure, and is not intended to limit the scope of protection of the disclosure.

The invention claimed is:

1. A method for picture coding, comprising:
training an initial feature extraction model with first training data, to obtain a target feature extraction model;
training an initial clustering model with second training data, to obtain a first clustering model;
performing feature extraction on picture data according to the target feature extraction model, to obtain feature information corresponding to the picture data, wherein the feature information is of a first-level quantity;
clustering the feature information according to the first clustering model, to obtain initially coded data corresponding to the picture data, wherein the initially coded data is of a second-level quantity;
clustering the initially coded data according to a second clustering model, to generate a clustering number corresponding to the initially coded data; and
coding the initially coded data and the clustering number, to generate coded data corresponding to the picture data, wherein the coded data is of a third-level quantity, the third-level quantity is greater than the second-level quantity, and the second-level quantity and the third-level quantity are less than the first-level quantity;
wherein the training the initial feature extraction model with the first training data, to obtain the target feature extraction model comprises:
inputting the first training data into the initial feature extraction model, to obtain a first feature map, a second feature map and a third feature map corresponding to the first training data;
calculating a first mutual information loss degree corresponding to the first feature map, a second mutual information loss degree corresponding to the second feature map, and a third mutual information loss degree corresponding to the third feature map, wherein the first mutual information loss degree characterizes an information loss degree of the first feature map with respect to the first training data, the second mutual information loss degree characterizes an information loss degree of the second feature map with respect to the first training data, and the third mutual information loss degree characterizes an information loss degree of the third feature map with respect to the first training data;
calculating gradient information according to the first mutual information loss degree, the second mutual information loss degree and the third mutual information loss degree; and
updating the initial feature extraction model according to the gradient information, to obtain the target feature extraction model.

2. The method of claim 1, wherein the inputting the first training data into the initial feature extraction model, to obtain the first feature map, the second feature map and the third feature map corresponding to the first training data comprises:
performing convolution on the first training data according to a first partial convolution layer, to obtain first information corresponding to the first training data;
pooling the first information according to a first pooling layer, to obtain the first feature map corresponding to the first training data;
performing convolution on the first feature map according to a second partial convolution layer, to obtain second information corresponding to the first training data;
pooling the second information according to a second pooling layer, to obtain the second feature map corresponding to the first training data;
performing convolution on the second feature map according to a third partial convolution layer, to obtain third information corresponding to the first training data; and
pooling the third information according to a third pooling layer, to obtain the third feature map corresponding to the first training data, wherein the third pooling layer is a global pooling layer.

3. The method of claim 2, wherein the training the initial clustering model with the second training data, to obtain the first clustering model comprises:
segmenting the second training data, to obtain a vector set corresponding to the second training data;
clustering the vector set, to obtain coded training data corresponding to the second training data;
calculating distance information corresponding to the coded training data; and
updating the initial clustering model according to the distance information, to obtain the first clustering model.

4. The method of claim 1, wherein the performing feature extraction on the picture data according to the target feature extraction model, to obtain the feature information corresponding to the picture data comprises:
performing convolution on the picture data according to a first partial convolution layer, to obtain fourth information corresponding to the picture data;
pooling the fourth information according to a first pooling layer, to obtain a fourth feature map corresponding to the picture data;
performing convolution on the fourth feature map according to a second partial convolution layer, to obtain fifth information corresponding to the picture data;
pooling the fifth information according to a second pooling layer, to obtain a fifth feature map corresponding to the picture data;
performing convolution on the fifth feature map according to a third partial convolution layer, to obtain sixth information corresponding to the picture data; and pooling the sixth information according to a third pooling layer, to obtain the feature information corresponding to the picture data, wherein the third pooling layer is a global pooling layer.

5. The method of claim 4, wherein the clustering the feature information according to the first clustering model, to obtain the initially coded data corresponding to the picture data comprises:
segmenting the feature information according to the first clustering model, to obtain a vector set corresponding to the picture data; and
clustering the vector set, to obtain the initially coded data corresponding to the picture data.

6. The method of claim 1, wherein after coding the initially coded data and the clustering number, to generate the coded data corresponding to the picture data, the method further comprises:
determining that at least two picture data are the same, in response to at least two coded data corresponding to the at least two picture data being the same.

7. A device for picture coding, comprising a processor and a non-volatile memory storing instructions executable by the processor, wherein the instructions, when executed by the processor, are configured to:
train an initial feature extraction model with first training data, to obtain a target feature extraction model;
train an initial clustering model with second training data, to obtain a first clustering model;
perform feature extraction on picture data according to the target feature extraction model, to obtain feature information corresponding to the picture data, wherein the feature information is of a first-level quantity;
cluster the feature information according to the first clustering model, to obtain initially coded data corresponding to the picture data, wherein the initially coded data is of a second-level quantity;
cluster the initially coded data according to a second clustering model, to generate a clustering number corresponding to the initially coded data; and
code the initially coded data and the clustering number, to generate coded data corresponding to the picture data, wherein the coded data is of a third-level quantity, the third-level quantity is greater than the second-level quantity, and the second-level quantity and the third-level quantity are less than the first-level quantity;
wherein in training the initial feature extraction model with the first training data, to obtain the target feature extraction model, the instructions, when executed by the processor, are configured to:
input the first training data into the initial feature extraction model, to obtain a first feature map, a second feature map and a third feature map corresponding to the first training data;
calculate a first mutual information loss degree corresponding to the first feature map, a second mutual information loss degree corresponding to the second feature map, and a third mutual information loss degree corresponding to the third feature map, wherein the first mutual information loss degree characterizes an information loss degree of the first feature map with respect to the first training data, the second mutual information loss degree characterizes an information loss degree of the second feature map with respect to the first training data, and the third mutual information loss degree characterizes an information loss degree of the third feature map with respect to the first training data;
calculate gradient information according to the first mutual information loss degree, the second mutual information loss degree and the third mutual information loss degree; and
update the initial feature extraction model according to the gradient information, to obtain the target feature extraction model.

8. The device of claim 7, wherein in inputting the first training data into the initial feature extraction model, to obtain the first feature map, the second feature map and the third feature map corresponding to the first training data, the instructions, when executed by the processor, are configured to:
perform convolution on the first training data according to a first partial convolution layer, to obtain first information corresponding to the first training data;
pool the first information according to a first pooling layer, to obtain the first feature map corresponding to the first training data;
perform convolution on the first feature map according to a second partial convolution layer, to obtain second information corresponding to the first training data;
pool the second information according to a second pooling layer, to obtain the second feature map corresponding to the first training data;
perform convolution on the second feature map according to a third partial convolution layer, to obtain third information corresponding to the first training data; and
pool the third information according to a third pooling layer, to obtain the third feature map corresponding to the first training data, wherein the third pooling layer is a global pooling layer.

9. The device of claim 8, wherein in training the initial clustering model with the second training data, to obtain the first clustering model, the instructions, when executed by the processor, are configured to:
segment the second training data, to obtain a vector set corresponding to the second training data;
cluster the vector set, to obtain coded training data corresponding to the second training data;
calculate distance information corresponding to the coded training data; and
update the initial clustering model according to the distance information, to obtain the first clustering model.

10. The device of claim 7, wherein in performing feature extraction on the picture data according to the target feature extraction model, to obtain the feature information corresponding to the picture data, the instructions, when executed by the processor, are configured to:
perform convolution on the picture data according to a first partial convolution layer, to obtain fourth information corresponding to the picture data;
pool the fourth information according to a first pooling layer, to obtain a fourth feature map corresponding to the picture data;
perform convolution on the fourth feature map according to a second partial convolution layer, to obtain fifth information corresponding to the picture data;
pool the fifth information according to a second pooling layer, to obtain a fifth feature map corresponding to the picture data;
perform convolution on the fifth feature map according to a third partial convolution layer, to obtain sixth information corresponding to the picture data; and pool the sixth information according to a third pooling layer, to obtain the feature information corresponding to the picture data, wherein the third pooling layer is a global pooling layer.

11. The device of claim 10, wherein in clustering the feature information according to the first clustering model, to obtain the initially coded data corresponding to the picture data, the instructions, when executed by the processor, are configured to:
segment the feature information according to the first clustering model, to obtain a vector set corresponding to the picture data; and
cluster the vector set, to obtain the initially coded data corresponding to the picture data.

12. The device of claim 7, wherein after coding the initially coded data and the clustering number, to generate the coded data corresponding to the picture data, the instructions, when executed by the processor, are further configured to:
determine that at least two picture data are the same, in response to at least two coded data corresponding to the at least two picture data being the same.

13. A non-transitory computer-readable storage medium, storing a program and applied to a device for picture coding, wherein the program, when executed by a processor, is configured to:
train an initial feature extraction model with first training data, to obtain a target feature extraction model;
train an initial clustering model with second training data, to obtain a first clustering model;
perform feature extraction on picture data according to the target feature extraction model, to obtain feature information corresponding to the picture data, wherein the feature information is of a first-level quantity;
cluster the feature information according to the first clustering model, to obtain initially coded data corresponding to the picture data, wherein the initially coded data is of a second-level quantity;
cluster the initially coded data according to a second clustering model, to generate a clustering number corresponding to the initially coded data; and
code the initially coded data and the clustering number, to generate coded data corresponding to the picture data, wherein the coded data is of a third-level quantity, the third-level quantity is greater than the second-level quantity, and the second-level quantity and the third-level quantity are less than the first-level quantity;
wherein in training the initial feature extraction model with the first training data, to obtain the target feature extraction model, the program, when executed by the processor, is configured to:
input the first training data into the initial feature extraction model, to obtain a first feature map, a second feature map and a third feature map corresponding to the first training data;
calculate a first mutual information loss degree corresponding to the first feature map, a second mutual information loss degree corresponding to the second feature map, and a third mutual information loss degree corresponding to the third feature map, wherein the first mutual information loss degree characterizes an information loss degree of the first feature map with respect to the first training data, the second mutual information loss degree characterizes an information loss degree of the second feature map with respect to the first training data, and the third mutual information loss degree characterizes an information loss degree of the third feature map with respect to the first training data;
calculate gradient information according to the first mutual information loss degree, the second mutual information loss degree and the third mutual information loss degree; and
update the initial feature extraction model according to the gradient information, to obtain the target feature extraction model.

14. The method of claim 1, wherein clustering the initially coded data according to the second clustering model, to generate the clustering number corresponding to the initially coded data comprises:
clustering the initially coded data according to a balanced iterative reducing and clustering using hierarchies (BIRCH) algorithm, to generate the clustering number corresponding to the initially coded data.

15. The method of claim 1, wherein a granularity of a cluster corresponding to the clustering number is finer than a granularity of a cluster set corresponding to the initially coded data.

16. The device of claim 7, wherein in clustering the initially coded data according to the second clustering model, to generate the clustering number corresponding to the initially coded data, the instructions, when executed by the processor, are configured to:
cluster the initially coded data according to a balanced iterative reducing and clustering using hierarchies (BIRCH) algorithm, to generate the clustering number corresponding to the initially coded data.

17. The device of claim 7, wherein a granularity of a cluster corresponding to the clustering number is finer than a granularity of a cluster set corresponding to the initially coded data.

* * * * *